US011812205B2

(12) United States Patent
Namiki et al.

(10) Patent No.: US 11,812,205 B2
(45) Date of Patent: Nov. 7, 2023

(54) OPTICAL CROSS-CONNECT DEVICE, OPTICAL TRANSMISSION SYSTEM, AND OPTICAL TRANSMISSION LINE CONNECTION ERROR DETECTION METHOD

(71) Applicant: Nippon Telegraph and Telephone Corporation, Tokyo (JP)

(72) Inventors: Masatoshi Namiki, Musashino (JP); Masahiro Yokota, Musashino (JP); Hiroki Kawahara, Musashino (JP); Hiroto Takechi, Musashino (JP); Katsuhiro Araya, Musashino (JP); Masaaki Inami, Musashino (JP); Daisaku Shimazaki, Musashino (JP); Hideki Maeda, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 155 days.

(21) Appl. No.: 17/625,028

(22) PCT Filed: Jul. 12, 2019

(86) PCT No.: PCT/JP2019/027801
§ 371 (c)(1),
(2) Date: Jan. 5, 2022

(87) PCT Pub. No.: WO2021/009814
PCT Pub. Date: Jan. 21, 2021

(65) Prior Publication Data
US 2022/0286762 A1 Sep. 8, 2022

(51) Int. Cl.
*H04Q 11/00* (2006.01)
(52) U.S. Cl.
CPC ..... *H04Q 11/0062* (2013.01); *H04Q 11/0005* (2013.01); *H04Q 2011/0043* (2013.01);
(Continued)

(58) Field of Classification Search
CPC .......... H04Q 11/0005; H04Q 11/0062; H04Q 2011/0043; H04Q 2011/0081;
(Continued)

(56) References Cited

U.S. PATENT DOCUMENTS

| 10,063,336 B1* | 8/2018 | Moynihan | H04L 41/0661 |
| 2014/0023360 A1* | 1/2014 | Iizuka | H04B 10/6161 |
| | | | 398/208 |
| 2017/0126312 A1* | 5/2017 | Maniloff | H04B 10/0771 |

OTHER PUBLICATIONS

[No Author Listed] [online], "Interfaces for the optical transport network," Telecommunication Standardization Sector of ITU, Recommendation ITU-T G.709/Y.1331, Jun. 2016, retrieved from URL <http://www.itu.int/rec/dologin_pub.asp?lang=e&id=T-REC-G.709-201606-I!!!PDF-E&type=items>, 244 pages.

* cited by examiner

*Primary Examiner* — Hibret A Woldekidan
(74) *Attorney, Agent, or Firm* — Fish & Richardson P.C.

(57) ABSTRACT

A monitoring control unit (22) of an OXC (20*d*) stores a management table (22*a*) in which pieces of information regarding a modulation mode, an FEC, and a frame mode of an optical signal are associated with each other, and sequentially changes the modulation mode, the FEC, and the frame mode according to the management table (22*a*) upon an LOS alert from a relay-side optical input/output unit (24) or an LOF alert from a DSP (25) being input thereto. Upon successfully receiving an appropriate optical signal according to the change, the monitoring control unit (22) acquires transmission source information included in the optical signal, and detects an occurrence of erroneous connection of an optical transmission line in an OXC (20*g*), which serves as a relay apparatus, when the acquired transmission source (Continued)

information indicates an optical cross-connect apparatus that is a transmission source different from an original transmission source.

5 Claims, 7 Drawing Sheets

(52) U.S. Cl.
CPC ............... *H04Q 2011/0081* (2013.01); *H04Q 2011/0083* (2013.01); *H04Q 2011/0088* (2013.01)

(58) Field of Classification Search
CPC ... H04Q 2011/0083; H04Q 2011/0088; H04Q 5/00; H04Q 11/0001; H04L 1/0083; H04B 10/0795; H04B 10/07951; H04B 10/07955; H04B 10/0797; H04B 10/0799; H04B 10/29; H04B 10/40
USPC .... 398/1, 10, 11, 12, 17, 25, 26, 27, 30, 32, 398/38, 45, 50
See application file for complete search history.

MANAGEMENT TABLE 22a

| | RATE INFORMATION | PARAMETER INFORMATION | CHANGE SETTING VALUE |
|---|---|---|---|
| MODULATION MODE | 100Gbps<br>200Gbps<br>... | MULTI-VALUE DEGREE<br>QPSK, 8QAM, 16QAM, 64QAM, ETC.<br><br>BAUD RATE<br>xGbps | ADAPTIVE FILTER SETTING VALUE<br><br>PHASE ESTIMATION SETTING VALUE |
| FEC | | REDUNDANCY<br>y%<br>CODE<br>STAIRCASE ETC. | FEC SETTING VALUE |
| FRAME MODE | | OTU4, OUT Cn, ETC. | FRAME MODE SETTING VALUE |

| PATTERN | TARGET TRANSPONDER | MODULATION MODE | FEC | FRAME MODE |
|---|---|---|---|---|
| | | OpS MANAGEMENT TABLE 30c | | |
| P1 | 1c1/1c2/1a5/1d6 | 200Gbps/16QAM | x% | OTU C2 |
| P2 | 1c3/1e4 | 100Gbps/QPSK | y% | OTU4 |
| P3 | | | | |
| ... | | | | |

OPTICAL CROSS-CONNECT DEVICE, OPTICAL TRANSMISSION SYSTEM, AND OPTICAL TRANSMISSION LINE CONNECTION ERROR DETECTION METHOD

CROSS-REFERENCE TO RELATED APPLICATIONS

This application is a National Stage application under 35 U.S.C. § 371 of International Application No. PCT/JP2019/027801, having an International Filing Date of Jul. 12, 2019. The disclosure of the prior application is considered part of the disclosure of this application, and is incorporated in its entirety into this application.

TECHNICAL FIELD

The present invention relates to an optical cross-connect apparatus, an optical transmission system, and an optical transmission line erroneous connection detection method that are capable of switching and transmitting an optical signal to any optical path by using a WSS (Wavelength Selective Switch) in an optical network.

BACKGROUND ART

OXCs (Optical Cross-Connects) used in optical transmission systems can function as an OADM (Optical Add Drop Multiplexer) that extracts (drop) an optical signal on which information from an optical network is superimposed, and superimposes (add) an optical signal, as well as being able to select any of a plurality of optical directions and transmit an optical signal by using a WSS. The WSS selects one of four optical paths that are connected to one WSS, and performs switching to transmit an optical signal to the selected optical path, for example. OXCs are optical cross-connect apparatuses that perform switching in an optical layer (the LO layer).

Suppose that an erroneous connection of an optical transmission line has occurred in an WSS in which an optical transmission line on the input side is erroneously connected to one path on the output side in the WSS for some reason, for example. In such a case, an optical signal transmitted from the transponder of a wrong transmission source is sent from the WSS to a path on the output side, and is received by the transponder (information repeater) in the OXC that is connected to this path.

The occurrence of a failure caused by an erroneous connection is detectable by utilizing the trace signal described below. The trace signal is defined in ITU-T Recommendation G.709, which is Non Patent Literature 1, and a TTI byte (Trail Trace Identifier: a section monitoring byte) is superimposed thereon. When the transponder on the transmitter side inserts a TTI byte, which is transmission source information that is unique to the trace signal, into the trace signal in the optical signal and transmits the signal, the transponder on the receiver side that has received this trace signal can identify the transponder on the transmitter side from the TTI byte in the trace signal. For example, if a TTI byte of a transponder other than the original transponder on the transmitter side is received by the transponder on the receiver side, it can be discerned that an optical signal arrives from a transponder (a transmission source) that is different from the original transmission source. Such discernment makes it possible to detect the occurrence of erroneous connection in the WSS.

CITATION LIST

Non Patent Literature

[NPL 1] ITU-T G.709, [online], 2019, [searched on Jun. 21, 2019], the Internet, <URL: http://www.itu.int/rec/dologin_pub.asp?lang=e&id=T-REC-G.709-20160 6-I!!PDF-E&type=items>

SUMMARY OF THE INVENTION

Technical Problem

However, in recent years, a plurality of OXC transponders support a plurality of modulation methods such as QPSK (Quadrature Phase Shift Keying) and QAM (Quadrature Amplitude Modulation), and frame methods using an OTU (Optical channel Transport Unit) frame, which will be described below, using the same DSP (Digital Signal Processor) or framer, and one of such a plurality of methods is used in a network. The OTU frame is defined in ITU-T Recommendation G.709.

In such a network, even if a trace signal is transmitted when the above-described erroneous connection occurs, such an error can only be detected as LOS (Loss of Signal) that indicates insufficient optical power of the optical signal, or LOF (Loss of Frame) that indicates frame loss of the optical signal. In other words, when an erroneous connection occurs, for example, an optical signal of 200 Gbps is input to the transponder, which is expected to receive at 100 Gbps according to a modulation method, for example, and therefore a mismatch occurs between the received power levels of the two optical signals, resulting in LOS (Loss of Signal) due to insufficient optical power, or LOF if the modulation methods and the frame formats of the optical signals do not match. In these cases, necessary information cannot be acquired from the optical signal.

In this way, if LOS or LOF is detected and the optical signal cannot be received normally, the TTI byte, which is transmission source information, cannot be acquired, and therefore there is a problem in that the transmission source of the optical signal cannot be specified, or the occurrence of erroneous connection of the optical transmission line cannot be discerned.

The present invention has been made in view of such circumstances, and a problem to be solved is to identify the occurrence of erroneous connection in an optical transmission line and to identify the transmission source of an optical signal related to the erroneous connection thus occurred.

Means for Solving the Problem

To solve the above-described problem, the optical cross-connect apparatus according to the present invention includes: a monitoring control unit that is connected to an OpS (Operation System) that performs control related to operation and maintenance of a plurality of optical cross-connect apparatuses that are connected to an optical network; a relay-side optical input/output unit that outputs an LOS (Loss of Signal) alert to the monitoring control unit when an optical signal received after being relayed by a relay apparatus that relays an optical signal transmitted from another optical cross-connect apparatus has insufficient optical power; a DSP (Digital Signal Processor) unit that performs processing to change a modulation mode of an optical signal received from the relay-side optical input/output unit, and outputs an LOF (Loss of Frame) alert to the monitoring control unit when the modulation mode of the optical signal relayed by the relay apparatus is non-conforming; and a framer unit that performs processing to change a frame mode and an FEC (Forward Error Correction) of an optical signal processed by the DSP unit, outputs an LOF alert to the monitoring control unit when the frame mode and the FEC of an optical signal is detected as being non-conforming, acquires unique transmission source information of another optical cross-connect apparatus included in the optical signal, and notifies the monitoring control unit of the transmission source information, wherein the monitoring control unit stores, in a storage unit, a management table in which pieces of information regarding the modulation mode, the FEC, and the frame mode are associated with each other, sequentially changes the modulation mode, the FEC, and the frame mode according to the management table upon the LOS alert or the LOF alert being input thereto, and, upon successfully receiving an appropriate optical signal according to the change, acquires transmission source information included in the optical signal, and detects an occurrence of erroneous connection of an optical transmission line of the relay apparatus when the acquired transmission source information indicates an optical cross-connect apparatus that is a transmission source different from an original transmission source.

Effects of the Invention

According to the present invention, it is possible to specify the occurrence of erroneous connection of an optical transmission line, and specify the transmission source of the optical signal related to the erroneous connection thus occurred.

DESCRIPTION OF EMBODIMENTS

The following describes an embodiment of the present invention with reference to the drawings. Note that in all the drawings of the present description, the same reference numerals are given to the components whose functions correspond to each other, and the descriptions thereof are omitted as appropriate.

Configuration of Embodiment

Figure 1:
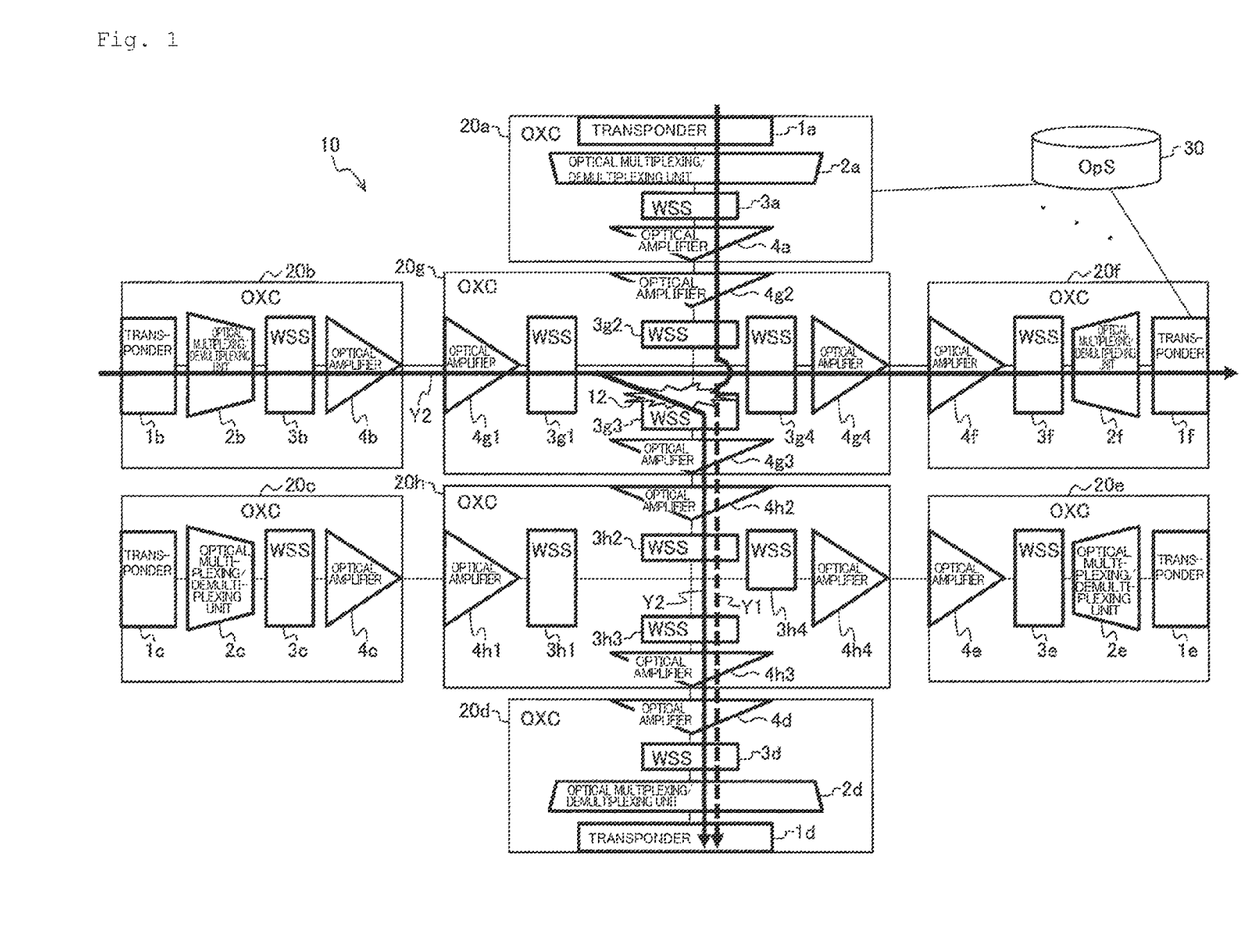
FIG. 1 is a block diagram showing a configuration of an optical transmission system that employs an optical cross-connect apparatus (OXC) according to an embodiment of the present invention.

FIG. 1 is a block diagram showing a configuration of an optical transmission system that employs an optical cross-connect apparatus (OXC) according to an embodiment of the present invention.

An optical transmission system 10 shown in FIG. 1 includes a plurality of OXCs, namely OXCs 20a, 20b, 20c, 20d, 20e, 20f, 20g, and 20h, which are connected to each other in vertical and horizontal directions via optical transmission lines constituted by optical fibers, and an OpS (Operation System) 30. The OpS 30 controls and operates the OXCs 20a to 20h to perform operation and maintenance thereon. Note that the OXCs 20a to 20h may be abbreviated as OXCs 20.

The OXC 20a to which a client such as a communication terminal (not shown) is connected includes a transponder 1a, an optical multiplexing/demultiplexing unit 2a, a WSS 3a, and an optical amplifier 4a. Similarly, the other OXCs 20b to 20f to which clients are connected respectively include transponders 1b to 1f, optical multiplexing/demultiplexing units 2b to 2f, WSSs 3b to 3f, and optical amplifiers 4b to 4f.

The transponders 1a to 1f may be abbreviated as the transponders 1, the optical multiplexing/demultiplexing units 2a to 2f may be abbreviated as the optical multiplexing/demultiplexing units 2, the WSSs 3a to 3f may be abbreviated as WSSs 3, and the optical amplifiers 4a to 4f may be abbreviated as optical amplifiers 4. Note that the OXCs 20a to 20f to which clients are connected may also be referred to as clients OXCs 20a to 20f. In addition, the OXCs 20g and 20h that relay optical signals and switches optical paths as described below may also be referred to as relay OXCs 20g and 20h. Note that the relay OXCs 20g and 20h constitute the relay apparatus described in the claims.

The relay OXC 20g, which relays optical signals between OXCs and performs processing to switch optical paths of optical signals, includes optical amplifiers 4g1, 4g2, 4g3, and 4g4 (which may be abbreviated as optical amplifiers 4) and WSSs 3g1, 3g2, 3g3, and 3g4 (may be abbreviated as WSSs 3). The relay OXC 20h, which performs similar processing, includes optical amplifiers 4h1, 4h2, 4h3, and 4h4 (which may be abbreviated as optical amplifiers 4) and WSSs 3h1, 3h2, 3h3, and 3h4 (may be abbreviated as WSSs 3).

The transponders 1 each relay an optical signal that is transmitted to and received from a client via an optical transmission line such as an optical fiber. Information regarding a client, for example, is superimposed on an optical signal.

The optical multiplexing/demultiplexing units 2 each perform processing to multiplex optical signals that have different wavelengths, and demultiplex multiplexed optical signals.

The WSSs 3 are wavelength selection switches, and each transmit an optical signal that has a predetermined wavelength according to an instruction from the OpS 30, to the instructed path. The WSSs 3 of the clients OXCs 20a to 20f perform optical signal transmission control (switching) between the clients and the relay OXC 20g or the relay OXC 20h. The WSSs 3 of the relay OXCs 20g and 20h performs switching to transmit an optical signal to any of the clients on the three paths. The optical amplifiers 4 amplify an optical signal.

Figure 2:
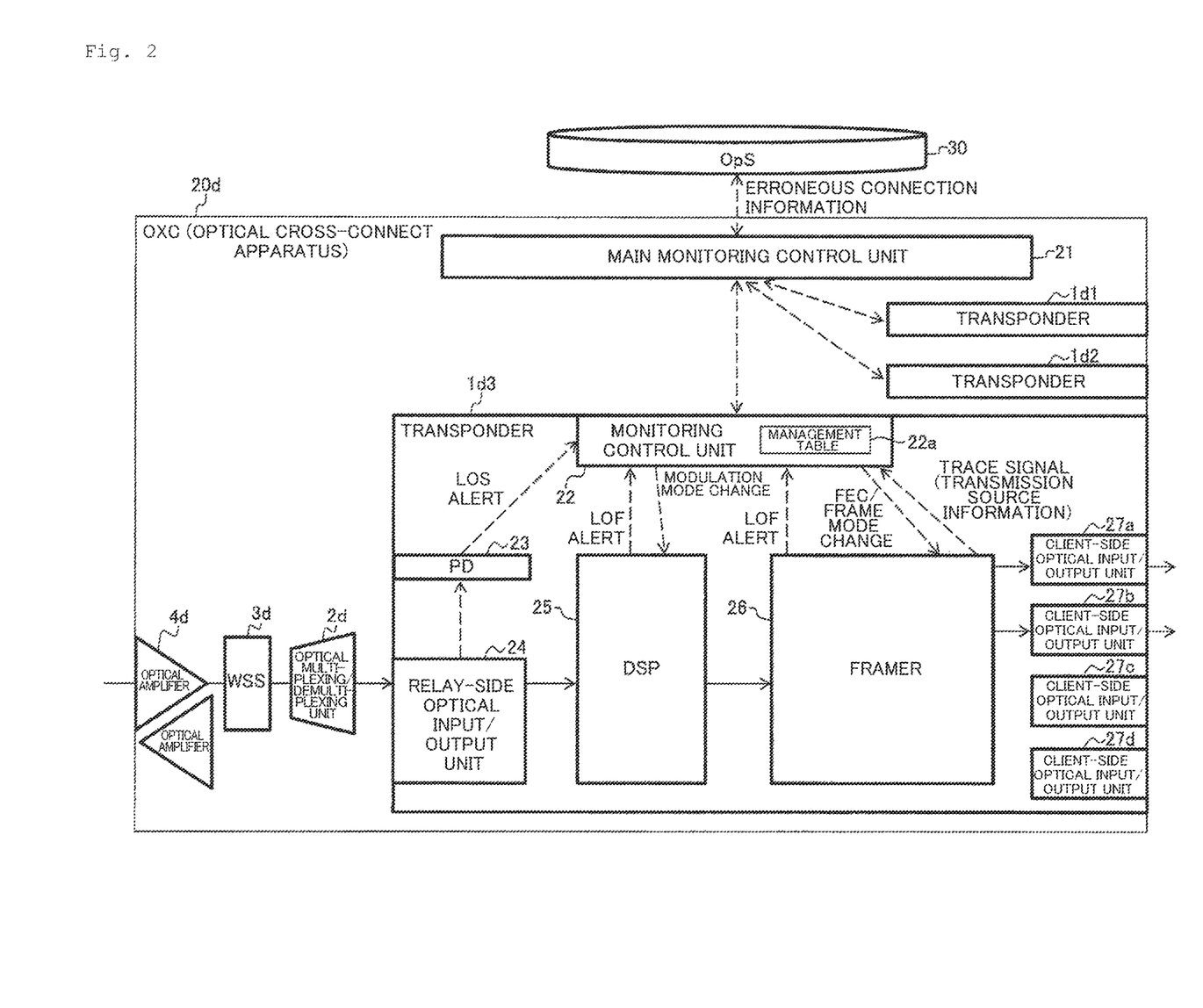
FIG. 2 is a block diagram showing the configuration of the OXC (optical cross-connect apparatus).

The present embodiment is characterized in that the client OXCs (optical cross-connect apparatuses) 20a to 20f that are connected to the relay OXCs 20g and 20h in vertical and horizontal directions perform optical transmission line erroneous connection detection processing (described below). FIG. 2 shows the OXC 20d as a representative to describe the configuration for performing the optical transmission line erroneous connection detection processing.

The OXC 20d shown in FIG. 2 includes a main monitoring control unit 21 that is connected to the OpS 30 via an optical transmission line, a plurality of transponders 1d1, 1d2, and 1d3 that are connected to the main monitoring control unit 21, the optical multiplexing/demultiplexing unit 2d, the WSS 3d, and the optical amplifier 4d. The configuration of the transponder 1d3 of the transponders 1d1 to 1d3 is illustrated as a representative.

The transponder 1d3 includes a monitoring control unit 22 that is connected to the main monitoring control unit 21, a PD (Photo Diode) 23 that converts an optical signal into an electrical signal, a relay-side optical input/output unit 24, a DSP 25, a framer 26, and a plurality of client-side optical input/output units 27a, 27b, 27c, and 27d. Note that the DSP 25 constitutes the DSP unit described in the claims. The framer 26 constitutes the framer unit described in the claims.

The relay-side optical input/output unit 24 is connected to the optical transmission line to which the other OXCs are connected, via the optical multiplexing/demultiplexing unit 2d, the WSS 3d, and the optical amplifier 4d. The relay-side optical input/output unit 24 outputs an optical signal that has been input thereto from other OXCs via the optical multiplexing/demultiplexing unit 2d, to the DSP 25. In addition, the relay-side optical input/output unit 24 has the function of detecting LOS that indicates insufficient optical power, from the input optical signal, and outputs a LOS alert to the monitoring control unit 22 via the PD 23 upon detecting LOS.

The following describes the above-described LOS detection. For example, as shown in FIG. 1, suppose that an erroneous connection failure indicated by a reference numeral 12 has occurred in the WSS 3g3 of the OXC 20g. This failure is erroneous connection 12 in which, while the WSS 3g3 is normally performing relay control to transmit the optical signal (an arrow Y1), transmitted from the OXC 20a, to the OXC 20d via the OXC 20h, the WSS 3g3 erroneously transmits the optical signal (an arrow Y2), transmitted from the OXC 20b, to the OXC 20d for a certain reason.

Here, suppose that, for the optical signal Y1, the modulation method is QPSK at 100 Gbps, the frame method is OTU c1, and the FEC (Forward Error Correction) is x %. For the optical signal Y2, the modulation method is 16QAM at 200 Gbps, the frame method is OTU c2, and the FEC is y %.

When the above erroneous connection 12 occurs, the optical signal Y2 that does not match the expected modulation method or frame format is received, and therefore if the received power level of the optical signal Y2 erroneously received by the OXC 20d deviates from the expected optical signal Y1 and the optical power thereof is lower than the receivable optical power, the relay-side optical input/output unit 24 detects LOS because of insufficient optical power. Upon detecting the LOS, the relay OXCs 20g and 20h outputs the LOS alert to the monitoring control unit 22 via the PD 23. The PD 23 converts the LOS alert from an optical signal into an electrical signal.

The DSP 25 performs predetermined digital signal processing on the optical signal input from the relay-side optical input/output unit 24. At this processing, if a wrong optical signal Y2 is input due to the above erroneous connection 12, the DSP 25 detects that the modulation method of the erroneously input optical signal Y2 is incorrect. Through this detection, the DSP 25 detects LOF that indicates a loss of an optical signal frame. At this detection, the DSP 25 outputs an LOF alert to the monitoring control unit 22. The DSP 25 also outputs the digital signal corresponding to the optical signal that has undergone digital signal processing, to the framer 26.

The framer 26 performs processing to change and set the frame mode (or frame format) of the digital signal corresponding to the optical signal, and the FEC. Upon the frame mode and the FEC of the optical signal being detected as non-conforming, the framer 26 outputs an LOF alert to the monitoring control unit, and upon the frame mode and the FEC are detected as conforming, the framer 26 acquires unique transmission source information such as a TTI byte from the trace signal (or an optical signal), which is a digital signal, and notifies the monitoring control unit 22. Furthermore, the framer 26 outputs the digital signal to each of the client-side optical input/output units 27a to 27d.

Each of the client-side optical input/output units 27a to 27d converts the digital signal into an optical signal and transmits it to the client, or, after receiving an optical signal from the client, converts it into a digital signal and outputs the digital signal to the framer 26.

Figure 4:
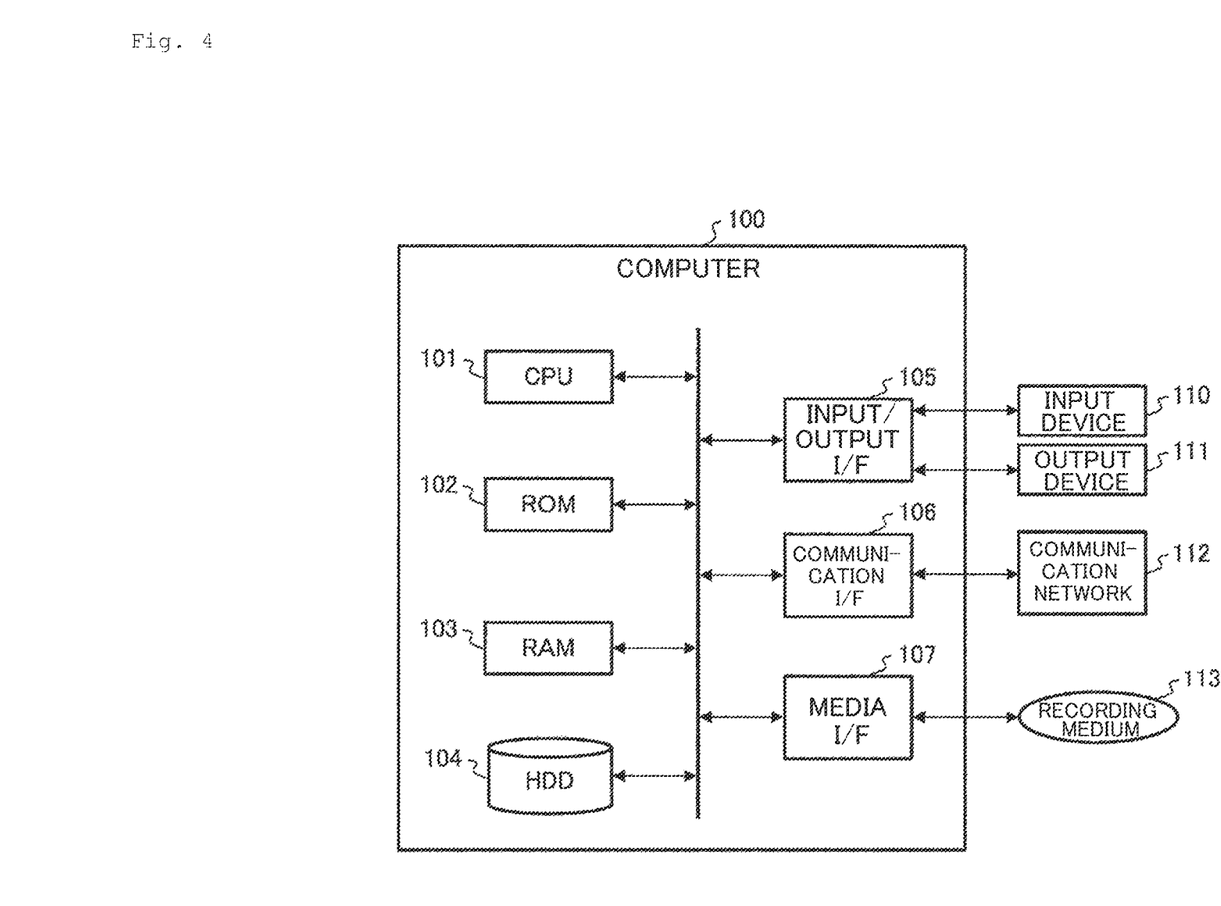
FIG. 4 is a hardware configuration diagram showing an example of a computer that realizes functions of the monitoring control unit.

The monitoring control unit 22 stores a management table 22a that for storing and managing pieces of information regarding the modulation mode, the FEC, and the frame mode in association with each other, in a storage unit such as a hard disk or a recording medium (see HDD 104 and a recording medium 113 shown in FIG. 4).

Figure 3:
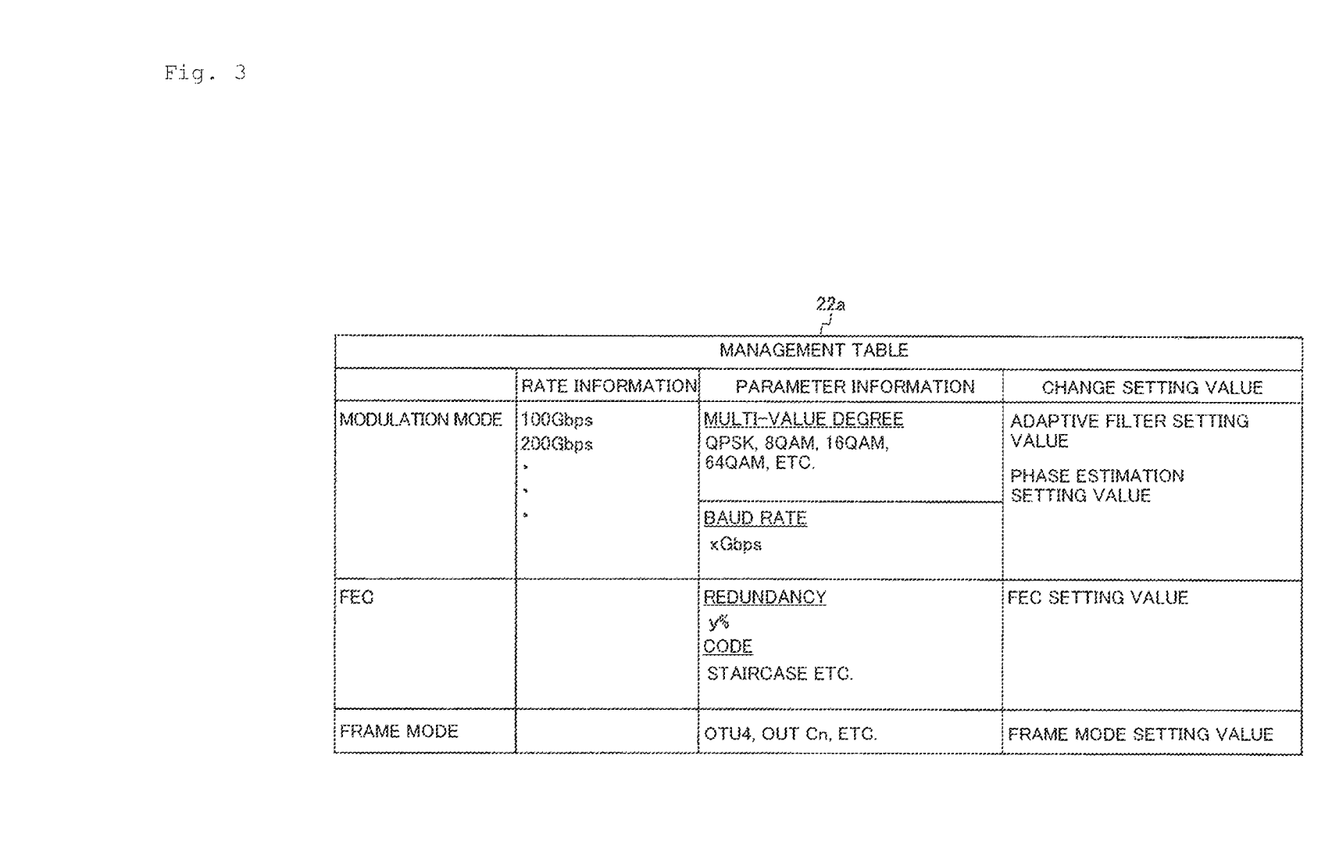
FIG. 3 is a diagram showing information configuration of a management table in a monitoring control unit of the OXC.

As shown in FIG. 3, the management table 22a stores rate information, parameter information, and change setting values related to the modulation mode, for optical signals, as well as the FEC and the parameter information and change setting values related to the frame mode, for optical signals.

The rate information related to the modulation mode indicates a speed rate such as 100 Gbps or 200 Gbps, for example. This rate is determined by a multi-value degree and a baud rate in the parameter information.

The multi-value degree indicates QPSK, 8QAM, 16QAM, or 64QAM, for example. If the multi-value degree indicates 16QAM, it means that sixteen different values (4 bits) can be sent at a time.

The baud rate is expressed as xGbaud, and the larger the value of the baud rate is, the greater the number of times modulation/demodulation is performed within the same period.

Therefore, if the multi-value degree is high and the baud rate is also high, the rate of the optical signal is high. However, if the multi-value degree and the baud rate are high, the transmission distance of the optical signal can be short or the optical signal deteriorates. Therefore, it is not possible to achieve the desired transmission performance of the optical signal by simply increasing the multi-value degree and the baud rate. In the optical transmission system 10 according to the present embodiment, the combination of the multi-value degree and the baud rate is appropriately set according to the purpose of transmission of the optical signal, like the above-described optical signal Y1 or the optical signal Y2.

The change setting values related to the modulation mode is information used to vary the digital signal processing in the DSP 25. In this example, the change setting values are adaptive filter setting values and phase estimation setting values.

The adaptive filter setting values and the phase estimation setting values are pieces of information that make it possible to appropriately demodulate optical signals that have various multi-value degrees. That is to say, it is possible to appropriately demodulate optical signals may changing the setting values according to the modulation mode of the optical signals.

The parameter information related to the FEC includes, for example, the redundancy of y % and the redundancy mode of error correction code such as Staircase. If the redundancy is increased, the rate of the signal will decrease. However, even if some mistakes are made, it is easy to restore the desired information because various pieces of information are included.

The parameter information related to the frame method includes, for example, OTU4, OTU Cn, etc. of the optical signal frame defined in ITU-T Recommendation G.709. These pieces of parameter information are to be changed to efficiently use optical signals. For example, the parameters (OTU4, OTU Cn) of the optical signal frame are changed in order to efficiently superimpose and transmit information for each of the optical signals modulated in different modes.

The change setting values related to the FEC and the frame mode are pieces of information that are used to make the frame formats of the optical signals variable through the framer processing performed by the framer 26. In this example, the change setting values are the FEC setting values and the frame method setting values.

Upon receiving the above-described LOS alert or LOF alert, the monitoring control unit 22 shown in FIG. 2 that stores such a management table 22*a* sequentially changes the modulation mode, the FEC, and the frame mode according to the management table 22*a*. According to such a change, upon successfully receiving an optical signal with appropriate optical power, the monitoring control unit 22 acquires unique transmission source information (a TTI byte) of the trace signal in the optical signal. Suppose that the acquired TTI byte is that of an OXC (for example, the client OXC 20*b*) other than the original transmission source OXC (for example, the client OXC 20*a* in FIG. 1). In this case, the monitoring control unit 22 can discern that an optical signal has arrived from the client OXC 20*b* different from the original client, and therefore can detect the occurrence of the erroneous connection 12 of the optical transmission line. Note that the expression "the client OXC different from the original client" is a simplification of the expression "the client OXC that is a transmission source different from the original transmission source", and such an expression is used in the following description as well.

The monitoring control unit 22 notifies the OpS 30 via the main monitoring control unit 21, of information indicating the occurrence of the erroneous connection 12 and erroneous connection information including the TTI byte from the OXC 20*b* different from the original transmission source OXC 20*a* resulting from the occurrence of the erroneous connection.

The OpS 30 recognizes the notification source OXC 20*d* of the erroneous connection information, the OXC 20*b* different from the original transmission source OXC 20*a*, and the original transmission source OXC 20*a*, from the erroneous connection information. After such recognition, the OpS 30 can recognize that, while both the optical signals Y1 and Y2 from the OXC20*b*, which is the transmission source of the TTI byte, are input to the OXC 20*g*, the incorrect optical signal Y2 has been transmitted to the OXC 20*d* via the relay OXC 20*g*. As a result of such detection, the OpS 30 can detect that erroneous connection has occurred.

<Hardware Configuration>
The above-described monitoring control unit 22 is realized using a computer 100 with the configuration shown in FIG. 4, for example. FIG. 4 is a hardware configuration diagram showing an example of the computer 100 that realizes the functions of the monitoring control unit 22. The computer 100 includes a CPU (Central Processing Unit) 101, a ROM (Read Only Memory) 102, a RAM (Random Access Memory) 103, an HDD (Hard Disk Drive) 104, an input/output I/F (Inter Face) 105, a communication I/F 106, and a media I/F 107.

The CPU 101 operates based on the program stored in the ROM 102 or the HDD 104 to control the functional units. The ROM 102 stores, for example, a boot program that is executed by the CPU 101 when the computer 100 is started up, and a program related to the hardware of the computer 100.

The CPU 101 controls an output device 111 such as a printer or a display, and an input device 110 such as a mouse or a keyboard, via the input/output I/F 105. The CPU 101 acquires data from the input device 110 or output generated data to the output device 111, via the input/output I/F 105.

The HDD 104 stores the program to be executed by the CPU 101 and data or the like that is to be used by the program. The HDD 104 stores the management table 22*a* (FIG. 2). The communication I/F 106 receives data from another apparatus (not shown) via a communication network 112 and outputs it to the CPU 101, and transmits data generated by the CPU 101 to another apparatus via the communication network 112.

The media I/F107 reads the program or data stored in the recording medium 113 and outputs it to the CPU 101 via the RAM 103. The CPU 101 loads a program related to desired processing from the recording medium 113 to the RAM 103 via the media I/F 107, and executes the loaded program. The recording medium 113 is, for example, an optical recording medium such as a DVD (Digital Versatile Disc) or a PD (Phase change rewritable Disk), a magneto-optical recording medium such as an MO (Magneto Optical disk), a magnetic recording medium, a conductor memory tape medium, a semiconductor memory, or the like. Note that the recording medium 113 may store the management table 22*a* (FIG. 2).

For example, when the computer 100 functions as the monitoring control unit 22 according to the embodiment, the CPU 101 of the computer 100 realizes the functions of the monitoring control unit 22 by executing the program loaded on the RAM 103. Also, the HDD 104 stores the data in the RAM 103. The CPU 101 reads and executes a program related to desired processing from the recording medium 113. In addition, the CPU 101 may read a program related to desired processing from another apparatus via the communication network 112.

<Optical Transmission Line Erroneous Connection Detection Operations Performed by OXCs>
Next, operations performed by an OXC (optical cross-connect apparatus) will be described with reference to the flowchart shown in FIG. 5.

Figure 5:
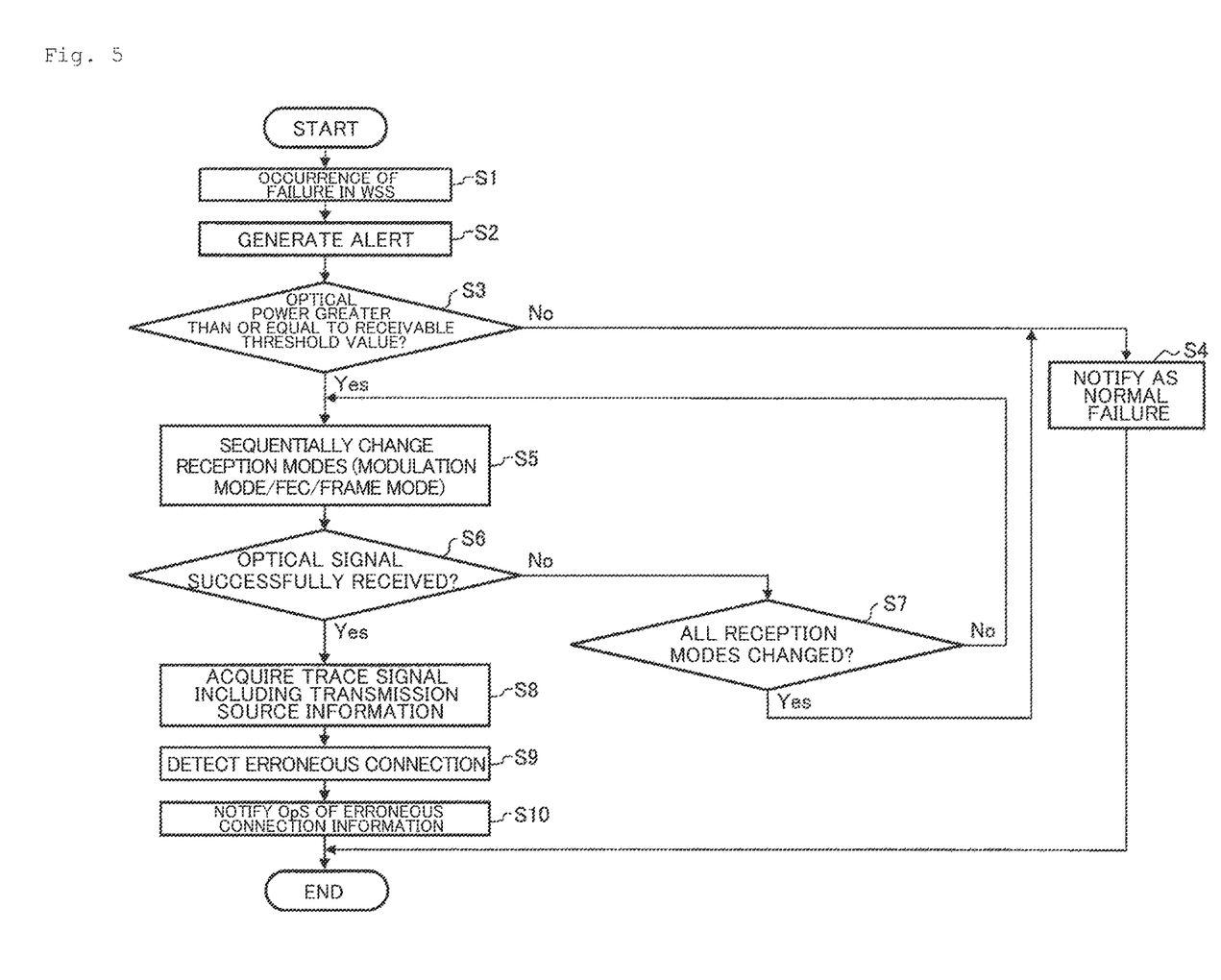
FIG. 5 is a flowchart illustrating operations for optical transmission line erroneous connection detection performed by the OXC (optical cross-connect apparatus).

In step S1 shown in FIG. 5, it is assumed that a failure of erroneous connection 12 has occurred in the WSS 3*g*3 of the OXC 20*g* shown in FIG. 1. This erroneous connection 12 is a case in which, when the WSS 3*g*3 is performing control to relay the optical signal Y1 transmitted from the normal client OXC 20*a*, to the OXC 20*d*, the optical signal Y2 transmitted from another client OXC 20*b* is transmitted to the relay path to which the optical signal Y1 is originally to be transmitted, due to a failure.

Here, the optical signal Y1 and the optical signal Y2 respectively have different pieces of information regarding the modulation mode, FEC, and frame mode thereof. Note that a modulation mode, an FEC and a frame mode may also be collectively referred to as reception modes.

In step S2, it is assumed that the monitoring control unit 22 of the OXC 20d (FIG. 2) is notified of the occurrence of either one or both of an LOS alert and an LOF alert. The LOS alert is detected by the relay-side optical input/output unit 24 and the LOF alert is detected by the DSP 25, and the monitoring control unit 22 is notified of the detection.

In step S3, the DSP 25 determines whether or not the optical power of the optical signal received by the relay-side optical input/output unit 24 is greater than or equal to a threshold value of receivable power. As a result, if it is determined that the optical power is not greater than or equal to the threshold value (No), the monitoring control unit 22 notifies the OpS 30 of a normal failure via the main monitoring control unit 21 in step S4.

On the other hand, if the result of the determination in step S3 described above is greater than or equal to the threshold value (Yes), the DSP 25 and the framer 26 sequentially change the reception modes (the modulation mode, the FEC, and the frame mode) in step S5. This change is to be made with reference to the management table 22a.

When the change is to be made, in step S6, the monitoring control unit 22 determines whether or not the optical signal has successfully been received.

As a result, if the optical signal has not successfully been received (No), the monitoring control unit 22, in step S7, determines whether or not all of the reception modes, namely the modulation mode the FEC, and the frame mode, have been changed. As a result of this determination, if the reception modes have not been changed (No), the reception modes are to be changed in the step S5 described above again.

As a result of this determination in step S7 described above, if all of the reception modes have been changed (Yes), the monitoring control unit 22 notifies the OpS 30 of a normal failure via the main monitoring control unit 21 in step S4.

On the other hand, as a result of the determination in step S6 described above, if the optical signal has successfully been received (Yes), the monitoring control unit 22 acquires a trace signal that includes a TTI byte, which is transmission source information, from the DSP 25 in step 38.

The transmission source indicated by the acquired TTI byte is, for example, the OXC 20b (FIG. 1). In this case, the monitoring control unit 22, in step S9, can discern from the TTI byte that the optical signal Y2 from the OXC 20b, which is different from the original transmission source, has been received. As a result of such discernment, the monitoring control unit 22 can discern that the optical signal Y2 has been transmitted from the client OXC 20d via the WSS 3g3 of the relay OXC 20g, and can therefore detect the occurrence of the erroneous connection 12 of an optical transmission line.

Thereafter, in step S10, the monitoring control unit 22 notifies the OpS 30 via the main monitoring control unit 21 of erroneous connection information including information regarding the occurrence of the above-described erroneous connection 12 and information regarding the original transmission source OXC 20a and the transmission source OXC20b that is different from the original transmission source.

<Effects of Embodiment>

With the optical transmission system 10 according to the present embodiment, the OXC 20d can detect the occurrence of the erroneous connection 12 of the optical transmission line at the relay OXC 20g, and therefore erroneous connec-tion of an optical transmission line can be specified. Also, it is possible to specify the OXC 20b that is the transmission source of the optical signal related to the above-described erroneous connection 12 thus occurred, based on the transmission source information included in the optical signal received from the relay OXC 20g.

Application Example of Embodiment

Figure 6:
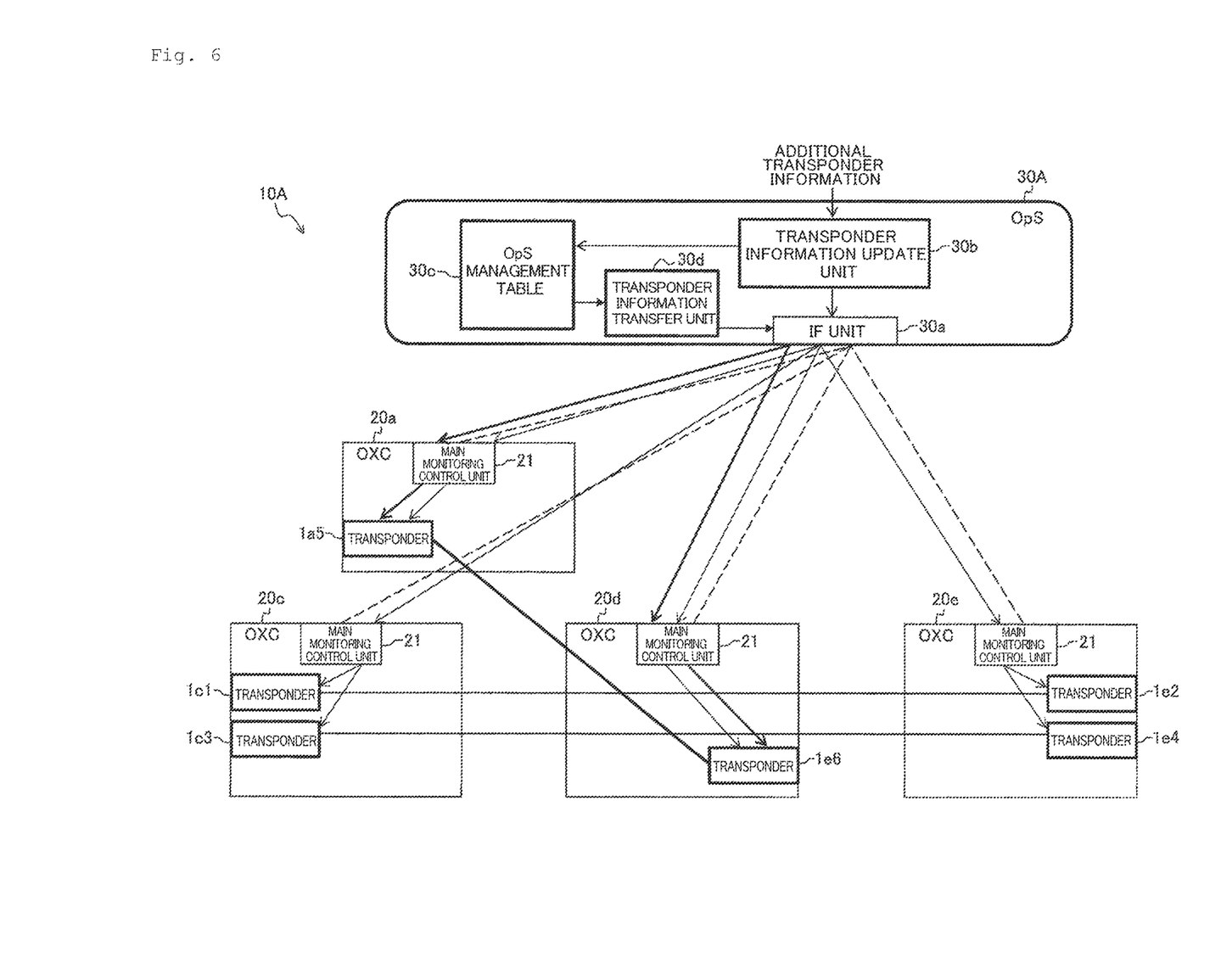
FIG. 6 is a block diagram showing a configuration of an optical transmission system according to an application example of the embodiment of the present invention.

FIG. 6 is a block diagram showing a configuration of an optical transmission system according to an application example of the embodiment of the present invention.

An optical transmission system 10A according to the application example shown in FIG. 6 is characterized in that an OpS 30A includes an IF unit 30a, a transponder information update unit (which may be abbreviated as an update unit) 30b, an OpS management table 30c, and a transponder information transfer unit (which may be abbreviated as a transfer unit) 30d. Also, when an additional transponder is provided in an OXC, transponder information can easily be added to the management table 22a (FIGS. 2 and 3) in the additional transponder, using transponder information (described below) registered in the OpS management table 30c.

Note that transponder information is information that collectively refers to pieces of information regarding the modulation mode, FEC, and the frame mode described above. FIG. 6 shows the OXCs 20a, 20c, 20d, and 20e of the OXCs 20a to 20f (FIG. 1), and these OXCs are connected to the IF unit 30a of the OpS 30A as indicated by the dashed line.

Regarding the transponders in the OXCs, pieces of information regarding the modulation mode, the FEC, and the frame mode of the same pattern, i.e., pieces of transponder information regarding the same pattern are registered for each set of a plurality of transponders.

Figure 7:
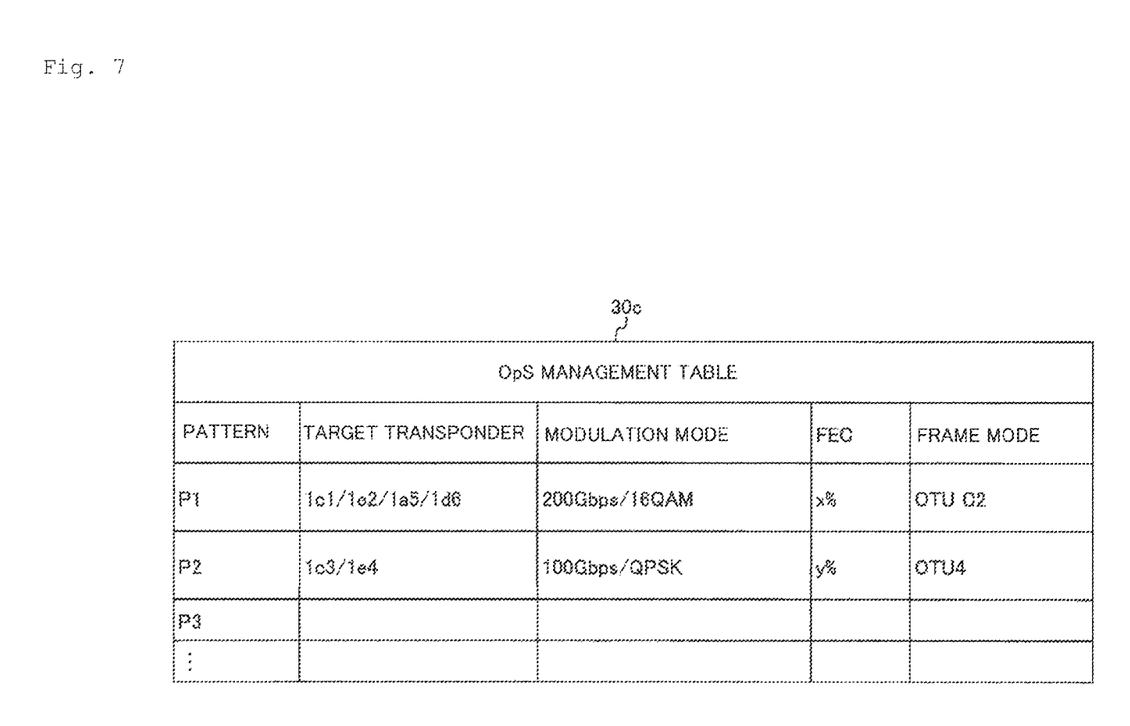
FIG. 7 is a diagram showing information configuration of an OpS management table in an OpS.

As shown in FIG. 7, the OpS management table 30c is a table in which pieces of unique information regarding a plurality of transponders (target transponders) in which pieces of transponder information regarding the same pattern are registered, and pieces of information (transponder information) regarding the modulation mode, the FEC, and the frame mode regarding the same pattern, are registered in association with each of different patterns P1, P2, and so on.

In this example, for the pattern P1, pieces of unique information 1c1, 1e2, 1a5, and 1d6 regarding the target transponders, information regarding the modulation mode "200 Gbps/16QAM", the FEC redundancy "xs", and information regarding the frame mode "OTU C2", which are pieces of transponder information regarding the same pattern, are registered in association with each other.

For the pattern P2, pieces of unique information 1c3 and 1e4 regarding the target transponders, information regarding the modulation mode "100 Gbps/QPSK", the FEC redundancy "y %", and information regarding the frame mode "OTU4", which are pieces of transponder information regarding the same pattern, are registered in association with each other.

With reference to FIG. 6 again, the update unit 30b collects transponder information regarding all the OXCs connected to the optical network, together with the corresponding transponder unique information, via the IF unit 30a, and registers them in the OpS management table 30c. At this registration, if transponder information that is the same as the collected transponder information is associated with the target transponder that is the same as the collection-target transponder, registration is not performed, and when different transponder information is associated therewith, it is updated by being overwritten with the collected transponder information.

That is to say, every time transponder information regarding an OXC is updated, the transponder information corresponding thereto in the OpS management table 30c is also updated to the information. For example, if pieces of transponder information regarding both the transponders 1c3 of the OXC20c and the transponders 1e4 of the OXC20e h updated, the update unit 30b searches for the transponders 1c3 and 1e4 associated with the pattern P2 shown in FIG. 7, and updates the both pieces of transponder information with the pieces of transponder information associated with the transponders 1c3 and 1e4 thus searched for, namely pieces of information regarding the modulation mode "100 Gbps/Q PSK", the FEC redundancy "y %", and the frame mode "OTU4".

Also, the update unit 30b registers the additional transponder information input when an additional transponder is added to the OXC, in the OpS management table 30c, in association with a new pattern Px (not shown), as a new target transponders 1dx (not shown).

When an additional transponder is provided in the OXC, the transfer unit 30d reads out the transponder information associated with the additional transponder from the OpS management table 30c, and transfers it to the additional transponder via the IF unit 30a. The transferred transponder information is registered in the management table 22a (FIGS. 2 and 3) of the additional transponder.

For example, when a transponder 1a5 of the OXC 20a and a transponder 1d6 of the OXC 20d are to be additionally provided, the transfer unit 30d searches for the transponders 1a5 and 1d6 associated with the pattern P1 shown in FIG. 7. Furthermore, the transfer unit 30d reads out the pieces of transponder information associated with the transponders 1a5 and 1d6 thus searched for, namely information regarding the modulation mode "200 Gbps/16QAM", the FEC redundancy "x %", and information regarding the frame mode "OTUC2". Thereafter, the transfer unit 30d transfers the pieces of transponder information thus read out, to the transponders 1a5 and 1d6 via the IF unit 30a. The pieces of transponder information thus transferred are registered in the management tables 22a of the additional transponders 1a5 and 1d6.

Also, the transponders return OK if the information transmitted from the transfer unit 30d is correct, and return NG if the information is incorrect. The OK or NG is to be checked and addressed by a maintenance personnel.

With the OpS 30A according to such an application example, the update unit 30b collects pieces of transponder information regarding all of the OXCs connected to the optical network, to the OpS management table 30c, and registers the pieces of transponder information so as to correspond one-to-one to the pieces of transponder information registered for the transponders of all of the OXCs. Also, when transponder information in a transponder of an OXC is updated, the update unit 30b updates transponder information in the OpS management table 30c corresponding to the updated transponder information so as to correspond one-to-one to the updated transponder information. Therefore, it is possible to constantly and appropriately mange the pieces of transponder information of all of the OXCs.

Also, the update unit 30b registers transponder information regarding the additional transponder to be added to an OXC in the OpS management table 30c as new target transponder 1dx, in association with a new pattern Px.

Thereafter, when an additional transponder of an OXC is to be provided, the transfer unit 30d need only transfer the transponder information associated with the additional transponder in the OpS management table 30c, to the additional transponder. Therefore, it is easy to register transponder information in the management table of the additional transponder.

<Effects>

(1) An optical cross-connect apparatus (OXC 20a to 20f) includes: a monitoring control unit 22 that is connected to an OpS 30 that performs control related to operation and maintenance of a plurality of optical cross-connect apparatuses connected to each other via an optical network; a relay-side optical input/output unit 24 that outputs an LOS alert to the monitoring control unit 22 when an optical signal that has been received after being relayed by a relay apparatus (relay OXC 20g, 20h) that relays an optical signal transmitted from another optical cross-connect apparatus has insufficient optical power; a DSP unit (DSP 25) that performs processing to change a modulation mode of an optical signal received from the relay-side optical input/output unit 24, and outputs an LOF alert to the monitoring control unit 22 when the modulation mode of the optical signal relayed by the relay apparatus is non-conforming; and a framer unit (framer 26) that performs processing to change a frame mode and an FEC of the optical signal processed by the DSP unit, outputs an LOF alert to the monitoring control unit when the frame mode and the FEC of the optical signal are detected as being non-conforming, and acquires unique transmission source information of another optical cross-connect apparatus included in the optical signal and notifies the monitoring control unit 22 of the transmission source information when the frame mode and the FEC are detected as being conforming, and the monitoring control unit 22 stores, in a storage unit, a management table 22a in which pieces of information regarding the modulation mode, the FEC, and the frame mode are associated with each other, sequentially changes the modulation mode, the FEC, and the frame mode according to the management table 22a upon the LOS alert or the LOF alert being input thereto, and, upon successfully receiving an appropriate optical signal according to the change, acquires transmission source information included in the optical signal, and detects an occurrence of erroneous connection of an optical transmission line of the relay apparatus when the acquired transmission source information indicates an optical cross-connect apparatus that is a transmission source different from an original transmission source.

With this configuration, by using an optical cross-connect apparatus, it is possible to specify the occurrence of erroneous connection of an optical transmission line, and specify the transmission source of the optical signal related to the erroneous connection thus occurred.

(2) An optical transmission system includes the optical cross-connect apparatuses described in (1) above, the optical cross-connect apparatuses each transmitting and receiving an optical signal to and from a client; a relay apparatus to which the plurality of optical cross-connect apparatuses are connected via an optical network, and that relays optical signals transmitted and received by the optical cross-connect apparatuses thus connected; and an OpS 30 that is connected to the relay apparatus and the optical cross-connect apparatuses via the optical network, and performs control related to operation and maintenance of the relay apparatus and the optical cross-connect apparatuses thus connected.

With this configuration, the OpS 30 can be notified of information regarding the occurrence of erroneous connection of optical transmission line of a relay apparatus specified by the optical cross-connection apparatus and information regarding the transmission source of the optical signal related to the erroneous connection. Therefore, with the OpS 30, it is possible to detect erroneous connection occurring in the entire optical transmission system. Also, it is possible to detect an optical cross-connect apparatus that is a transmission source different from the original transmission source, the optical signal from which is relayed due to erroneous connection.

(3) The OpS 30 includes an OpS management table 30c in which pieces of unique information regarding a plurality of transponders and pieces of transponder information are registered in association with each other for each of different optical signal patterns, each of the pieces of transponder information including information regarding a modulation mode, an FEC, and a frame mode for the same optical signal pattern; and an update unit 30b that collects pieces of transponder information registered in transponders of all of the optical cross-connect apparatuses that are connected to the optical network and registers the pieces of transponder information in the OpS management table, and, when transponder information in a transponder is updated, updates transponder information in the OpS management table corresponding to the updated transponder information so as to correspond one-to-one to the updated transponder information.

With this configuration the OpS 30A can constantly and appropriately mange pieces of transponder information regarding the transponders in all of the optical cross-connect apparatuses.

(4) The OpS 30A further includes a transfer unit 30d that, when an additional transponder is provided, transfers transponder information that is associated with the additional transponder, acquired from the OpS management table 30c, to the additional transponder, and the update unit 30b registers transponder information regarding the newly added transponder in the OpS management table 30c as transponder information regarding an additional target transponder, in association with a new pattern.

With this configuration, when an additional transponder is provided, the transfer unit 30d need only transfer the piece of transponder information associated with the additional transponder in the OpS management table 30c. Therefore, it is easy to register transponder information in the additional transponder.

Other specific configurations may be modified when necessary, without departing from the spirit of the present invention.

REFERENCE SIGNS LIST 1a, 1b, 1c, 1d, 1e, 1f, 1d1, 1d2, 1d3 Transponder
2a, 2b, 2c, 2d, 2e, 2f Optical multiplexing/demultiplexing unit
3a, 3b, 3c, 3d, 3e, 3f WSS
4a, 4b, 4c, 4d, 4e, 4f Optical amplifier
10 Optical transmission system
20a-20h OXC
21 Main monitoring control unit
22 Monitoring control unit
22a Management table
23 PD
24 Relay-side optical input/output unit
25 DSP
26 Framer
27a, 27b, 27c, 27d Client-side optical input/output unit
30,30A OpS
30a IF unit
30b Transponder information update unit (Update unit)
30c OpS management table
30d Transponder information transfer unit (Transfer unit)

The invention claimed is:

1. An optical cross-connect apparatus comprising:
a monitoring control unit including one or more processors, the monitoring control unit connected to an OpS (Operation System) that is configured to perform control related to operation and maintenance of a plurality of optical cross-connect apparatuses that are connected to an optical network;
a relay-side optical input/output unit, including one or more processors, configured to output an LOS (Loss of Signal) alert to the monitoring control unit when an optical signal that has received after being relayed by a relay apparatus that relays an optical signal transmitted from another optical cross-connect apparatus has insufficient optical power;
a DSP (Digital Signal Processor) unit configured to perform processing to change a modulation mode of an optical signal received from the relay-side optical input/output unit, and output an LOF (Loss of Frame) alert to the monitoring control unit when the modulation mode of the optical signal relayed by the relay apparatus is non-conforming; and
a framer unit, including one or more processors, configured to perform processing to change a frame mode and an FEC (Forward Error Correction) of the optical signal processed by the DSP unit, output an LOF alert to the monitoring control unit when the frame mode and the FEC of the optical signal are detected as being non-conforming, and acquire unique transmission source information of another optical cross-connect apparatus included in the optical signal and notifies the monitoring control unit of the transmission source information when the frame mode and the FEC are detected as being conforming,
wherein the monitoring control unit is configured to store, in a storage unit, a management table in which pieces of information regarding the modulation mode, the FEC, and the frame mode are associated with each other, sequentially change the modulation mode, the FEC, and the frame mode according to the management table upon the LOS alert or the LOF alert being input thereto, and, upon successfully receiving an appropriate optical signal according to the change, acquire transmission source information included in the optical signal, and detects an occurrence of erroneous connection of an optical transmission line of the relay apparatus when the acquired transmission source information indicates an optical cross-connect apparatus that is a transmission source different from an original transmission source.

2. An optical transmission system comprising:
one or more optical cross-connect apparatuses according to claim 1, the optical cross-connect apparatuses each transmitting and receiving an optical signal to and from a client;
a relay apparatus to which the plurality of optical cross-connect apparatuses are connected via an optical network, and is configured to relay optical signals transmitted and received by the optical cross-connect apparatuses thus connected; and
an OpS that is connected to the relay apparatus and the optical cross-connect apparatuses via the optical network, and configured to perform control related to operation and maintenance of the relay apparatus and the optical cross-connect apparatuses thus connected.

3. The optical transmission system according to claim 2, wherein the OpS includes:

an OpS management table in which pieces of unique information regarding a plurality of transponders and pieces of transponder information are registered in association with each other for each of different optical signal patterns, each of the pieces of transponder information including information regarding a modulation mode, an FEC, and a frame mode for the same optical signal pattern; and an update unit, including one or more processors, configured to collect pieces of transponder information registered in transponders of all of the optical cross-connect apparatuses that are connected to the optical network and registers the pieces of transponder information in the OpS management table, and, when transponder information in a transponder is updated, update transponder information in the OpS management table corresponding to the updated transponder information so as to correspond one-to-one to the updated transponder information.

4. The optical transmission system according to claim 3, wherein:

the OpS further includes a transfer unit configured to, when an additional transponder is provided, transfer transponder information that is associated with the additional transponder, acquired from the OpS management table, to the additional transponder, and the update unit is configured to register transponder information regarding the newly added transponder in the OpS management table as transponder information regarding an additional target transponder, in association with a new pattern.

5. An optical transmission line erroneous connection detection method that is performed by an optical cross-connect apparatus that includes a monitoring control unit that is connected to an OpS that performs control related to operation and maintenance of a plurality of optical cross-connect apparatuses that are connected to an optical network, wherein the transmission line erroneous connection detection method comprises:

a step of outputting an LOS alert to the monitoring control unit when an optical signal that has been received after being relayed by a relay apparatus that relays an optical signal transmitted from another optical cross-connect apparatus has insufficient optical power;

a step of performing processing to change a modulation mode of the received optical signal, and outputting an LOF alert to the monitoring control unit when the modulation mode of the optical signal relayed by the relay apparatus is non-conforming;

a step of performing processing to change a frame mode and an FEC of the received optical signal, outputting an LOF alert to the monitoring control unit when the frame mode and the FEC of the optical signal are detected as being non-conforming, and acquiring unique transmission source information of another optical cross-connect apparatus included in the optical signal and notifying the monitoring control unit of the transmission source information when the frame mode and the FEC are detected as being conforming; and a step performed by the monitoring control unit, of sequentially changing the modulation mode, the FEC, and the frame mode upon the LOS alert or the LOF alert being input thereto, and, upon successfully receiving an appropriate optical signal according to the change, acquiring transmission source information included in the optical signal, and detecting an occurrence of erroneous connection of an optical transmission line of the relay apparatus when the acquired transmission source information indicates an optical cross-connect apparatus that is a transmission source different from an original transmission source.

* * * * *